United States Patent

Kita et al.

[11] 3,902,157
[45] Aug. 26, 1975

[54] WORN BRAKE LINING DETECTOR

[75] Inventors: Yasuo Kita; Masachika Yamamoto, both of Hyogo, Japan

[73] Assignee: Sumitomo Electric Industries, Ltd., Osaka, Japan

[22] Filed: June 1, 1973

[21] Appl. No.: 365,947

[30] Foreign Application Priority Data
July 17, 1972 Japan.............................. 47-71927

[52] U.S. Cl............... 340/52 A; 188/1 A; 200/61.4
[51] Int. Cl.² .................... B60T 17/22; G08B 21/00
[58] Field of Search.... 340/52 A, 52 B, 378, 384 E; 188/1 A; 200/61.4

[56] References Cited
UNITED STATES PATENTS

| | | | |
|---|---|---|---|
| 3,556,258 | 1/1971 | Winge et al......................... | 188/1 A |
| 3,675,197 | 7/1972 | Bennett et al. ..................... | 200/61.4 |
| 3,740,566 | 6/1973 | Newstead.......................... | 340/52 A |
| 3,763,488 | 10/1973 | Klasing............................. | 340/384 E |
| 3,796,951 | 3/1974 | Joseph ............................. | 340/378 |
| 3,825,891 | 7/1974 | Kinast.............................. | 340/52 A |

*Primary Examiner*—John W. Caldwell
*Assistant Examiner*—Joseph E. Nowicki
*Attorney, Agent, or Firm*—Sughrue, Rothwell, Mion, Zinn and Macpeak

[57] ABSTRACT

A fail-safe detector circuit for detecting a worn condition of the friction linings mounted on the brake pads of a disc brake assembly. A conductor loop project through each brake pad into the lining to a point defined as the working limit of the lining. When the lining wears down to this working limit, an alarm is energized. The conductors embedded in the linings are connected in a series circuit with a fuse and a relay coil. Connected in parallel with this series circuit is an alarm circuit consisting of the relay contacts and an alarm device. Under normal operating condition, current from a battery flows through the series circuit to energize the relay and hold open the relay contacts, so that the alarm device is not energized. When either one of the linings wears down beyond the working limit, the associated embedded conductor loop electrically engages the rotating disc of the brake assembly, thereby short-circuiting the series circuit and causing the fuse to blow and open the series circuit so that the relay coil is de-energized. Consequently, the relay switch contacts in the alarm circuit close to permit energization of the alarm device by the battery.

8 Claims, 4 Drawing Figures

FIG. 1
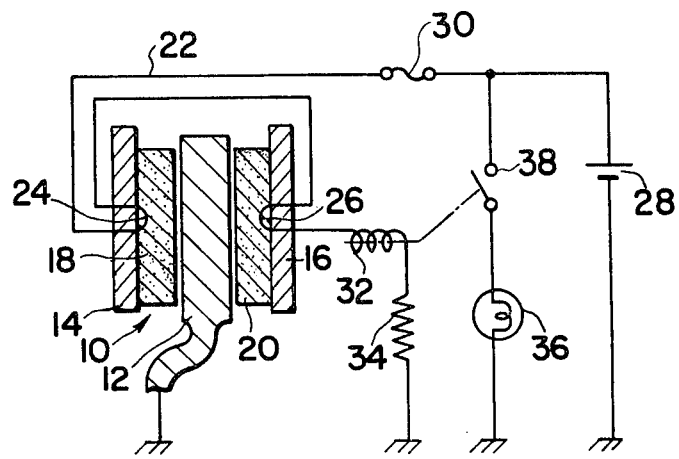
FIG. 2
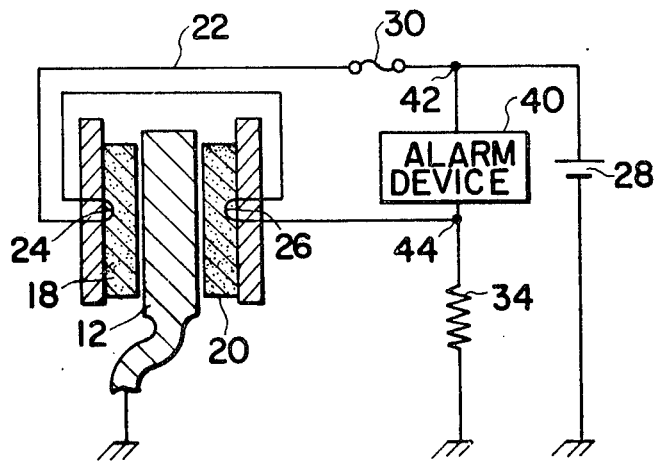
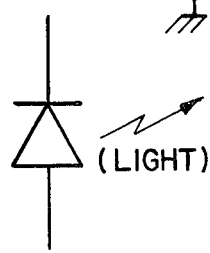
FIG. 3
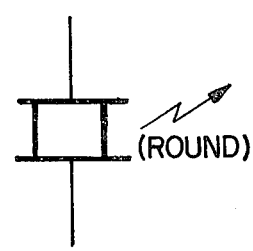
FIG. 4

WORN BRAKE LINING DETECTOR

BACKGROUND OF THE INVENTION

1. Field of the Invention

The invention relates to the field of electrical alarm circuits for detecting a worn condition of friction brake linings, and, more particularly, to such a circuit which is fail-safe in operation and convenient to inspect.

2. Description of the Prior Art

Recently, stricter safety controls have been required for vehicles. One such safety control is an electric detector circuit for detecting the condition of the friction brake linings of the vehicle being worn down beyond a predetermined working limit.

One known detector is disclosed in West German Patent Publication No. 1,045,259. However, one disadvantage of such conventional worn brake lining detector circuits is that the circuit can become open circuited because of wheel vibration, etc., and as a result, the alarm is not energized when the brake lining becomes worn beyond the working limit.

In other conventional detector circuits, the worn brake lining alarm is issued only when the brakes are operated. Furthermore, inspection of such worn brake lining detector circuits for defects in the circuits themselves is difficult to make.

SUMMARY OF THE INVENTION

The present invention overcomes the disadvantages of the prior art devices by providing a worn brake lining detector circuit which is fail-safe in operation and is inexpensive to produce.

The object of the invention is accomplished by forming a series circuit including a fuse and an electrical conductor including loops which are embedded in the friction linings and which are adapted to electrically contact the rotating brake disc when the linings are worn beyond their working limit. At this time, the series circuit is short-circuited so that the fuse is blown, thereby opening the circuit and causing an alarm to be actuated.

BRIEF DESCRIPTION OF THE DRAWING

FIG. 1 is a schematic diagram illustrating a preferred embodiment of the invention.

FIG. 2 is a schematic diagram illustrating another embodiment of the invention.

FIGS. 3 and 4 are schematic diagrams of a light-emitting diode alarm device and a piezoelectric buzzer alarm device, respectively.

DETAILED DESCRIPTION OF THE EMBODIMENTS

In FIG. 1, a disc brake assembly 10 includes a rotating brake disc 12 and a pair of brake pads 14 and 16 having mounted thereon friction lining 18 and 20 respectively. An insulated electrical conductor 22 has formed therein two fixed loops 24 and 26. Loop 24 projects through the pad 14 and into the back of the lining 18 to a point corresponding to the working limit of the lining 18. That is, the point at which the loop 24 is embedded in the back of the lining 18 is the point beyond which the brake lining should not wear, and it is at this point that it is desired to actuate an alarm to indicate that the lining has worn down to its working limit. In like manner, loop 26 is embedded in the lining 20 at a point corresponding to the working limit of that lining. When either one of the linings is worn down to its working limit, the corresponding conductor loop engages the adjacent face of the rotating disc 12 which wears through the insulation on the conductor and makes electrical contact with the conductor. Since the disc 12 is grounded, conductor 22 is connected to ground, thereby forming a short-circuit between ground and the battery 28 which is connected in series with a fuse 30 and the conductor 22. Consequently, the fuse 30 blows to interrupt or open the circuit between the battery 28 and the conductor 22.

The present invention is an improved circuit for providing a fail-safe warning when the conductor 22 is interrupted by the blowing of the fuse 30. The remainder of the circuit illustrated in FIG. 1 accomplishes this object. Connected in series with the fuse 30, conductor 22 and conductor loops 24 and 26, are a relay coil 32 and resistor 34, with the lower end of the resistor being connected to ground. Connected in parallel with this series circuit and with the battery 28 is another series circuit including an alarm device, such as a lamp, and the relay contacts 38. When relay coil 32 is energized, i.e. when current is flowing through the coil, the relay contacts are held open (as illustrated in FIG. 1), thereby open-circuiting the series alarm circuit. The relay coil is energized when the friction linings have not worn down to their working limit.

However, when either one or both of the friction linings have worn down to their working limit such that the rotating disc 12 makes electrical contact with either one or both of the conductor loops 24 and 26, the fuse 30 blows as described above, thereby interrupting current flow through conductor 22 and deenergizing the relay coil 32. Consequently, the relay contacts 38 close, thereby completing a circuit between the battery 28 and the lamp 36 to energize the lamp whose illumination serves as a warning or alarm to indicate to the driver of the vehicle that the friction linings have worn down to their working limit.

Thus it can be seen that the improved circuit in FIG. 1 actually detects any interruption of the series circuit including the conductor 24 and 26 regardless of the cause of the interruption. The causes can be the blowing of the fuse 30 as described above or disconnection of the lead wires because of poor connections, vibrations of the wheel, etc. In any event, fail-safe operation is provided to issue a warning regardless of the cause of the interruption of the conductor loop circuit. By contrast, in the prior art device described above, such accidental interruptions of the conductor loop circuit disables the alarm circuit so that a subsequent wearing down of the friction linings beyond their working limits cannot be detected.

The resistor 34 merely limits the current flow through the series circuit including conductor 22, conductor loops 24 and 26, and the relay coil 32 when the circuit is operating in its non-alarm condition.

FIG. 2 illustrates a variation of the circuit illustrated in FIG. 1. In FIG. 2, the alarm device consists of light-emitting diode (FIG. 3) or a piezoelectric buzzer (FIG. 4) which is connected in parallel with the series circuit including the conductor loops 24 and 26. For example, as illustrated in FIG. 2, one end of the light-emitting diode is connected to a junction 42 between the fuse 30 and the battery 28, while the other end of the diode is connected to the junction 44 between the loop 26 and the upper end of the resistor 34. Normally, device 40 is not energized since it is short-circuited or shunted by the series circuit including the fuse 30, conductor 22, conductor loops 24 and 26 and the resistor 34. However, upon interruption of the series circuit, current then flows from the battery through the device 40 and resistor 34 to ground.

When the present invention is used in vehicles, the fuse 30, relay coil 32 and contacts 38, alarm device 36 or 40, resistor 34, etc., are located near the driver's seat, whereas the other parts are remotely located and connected to the first part of the circuit by long harness wires. Because of Applicant's improved circuit, if any open circuit occurs in the harness wires or in the remotely located parts, the alarm device will immediately be energized. Similarly, if short-circuit occurs, the fuse will blow to cause an open circuit which is again detected by energization of the alarm. Furthermore, the location of the fuse near the driver's seat allows convenient inspection thereof. Accordingly, the present invention provides a worn friction lining warning device which is fail-safe in operation and convenient to inspect.

While the invention has been particularly shown and described with reference to preferred embodiments thereof, it will be understood by those skilled in the art that various changes in form and details may be made therein without departing from the spirit and scope of the invention.

We claim:

1. In a worn brake-lining detector circuit of the type in which an electrical conductor embedded in the lining electrically contacts a rotating braking member when the lining is worn down beyond a predetermined working limit to energize an alarm, an improved alarm circuit comprising:
    a. a series circuit including a circuit breaker means connected in series with said electrical conductor and operative to interrupt said circuit in response to an overcurrent caused by electrical contact between said conductor and said braking member,
    b. a single electric power source coupled to said series circuit and said braking member so that electric current from said single power source normally flows through said series circuit, and
    c. a normally de-energized alarm device connected in a circuit parallel with said series circuit, said parallel circuit being connected to said single power source and normally having a higher impedance than said series circuit so that interruption of said series circuit causes sufficient current to flow from said single power source and through said alarm device to energize it.

2. The improved circuit as defined in claim 1 further comprising a relay switch having its normally energized operating coil connected in series with said series circuit and its normally open contacts connected in series with said alarm device, whereby interruption of said series circuit de-energizes said coil to close said contacts so that current flows from said power source and through said contacts and said alarm device to energize said alarm device.

3. The improved circuit as defined in claim 1 wherein said alarm device comprises a light-emitting diode.

4. The improved circuit as defined in claim 1 wherein said alarm device comprises a piezo-electric buzzer.

5. The improved alarm circuit as defined in claim 1 wherein said circuit breaker means is a fuse.

6. The improved alarm circuit as defined in claim 1, further comprising a resistor connected in series with both said parallel circuit and said series circuit.

7. The improved alarm circuit as defined in claim 2 wherein one side of said power source is connected to one end of said series circuit, the other end of said power source is connected to both said braking member and to the other end of said series circuit, said circuit breaker means is connected between said one side of said power source and the point at which said conductor contacts said braking member, and said coil is connected between said point and said other side of said power source.

8. The improved alarm circuit as defined in claim 7, further comprising a resistor connected between said point and said other side of said power source and in series with said coil.

* * * * *